(12) United States Patent
Creasy et al.

(10) Patent No.: US 11,437,949 B2
(45) Date of Patent: Sep. 6, 2022

(54) STOWING OF SOLAR POWER DEVICES

(71) Applicant: ARRAY TECHNOLOGIES, INC., Albuquerque, NM (US)

(72) Inventors: Lucas Creasy, Scottsdale, AZ (US); Todd DarVel Andersen, Heber City, UT (US); Jon Andrew Sharp, Fort Collins, CO (US); James John Stoshak, Apex, NC (US); Sanket Shah, Pflugerville, TX (US); James Fusaro, Albuquerque, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 17/505,518

(22) Filed: Oct. 19, 2021

(65) Prior Publication Data
US 2022/0123689 A1   Apr. 21, 2022

Related U.S. Application Data

(60) Provisional application No. 63/093,685, filed on Oct. 19, 2020.

(51) Int. Cl.
*H02S 20/30* (2014.01)
*G05B 17/02* (2006.01)

(52) U.S. Cl.
CPC .............. *H02S 20/30* (2014.12); *G05B 17/02* (2013.01)

(58) Field of Classification Search
CPC ................................ H02S 20/30; G05B 17/02
See application file for complete search history.

(56) References Cited

U.S. PATENT DOCUMENTS

| | | | |
|---|---|---|---|
| 2014/0271185 A1* | 9/2014 | Baker | F03D 7/048 416/1 |
| 2017/0234580 A1* | 8/2017 | Worden | F24S 30/425 126/606 |
| 2018/0335018 A1* | 11/2018 | Cao | F03D 7/046 |
| 2018/0358921 A1* | 12/2018 | Henderson | F24S 30/452 |
| 2020/0162015 A1* | 5/2020 | Upfill-Brown | H02S 20/32 |
| 2021/0311507 A1* | 10/2021 | Needham | G01P 5/001 |

FOREIGN PATENT DOCUMENTS

WO    2018212409 A1    11/2018

OTHER PUBLICATIONS

International Search Report and Written Opinion for International Application No. PCT/US2021/055683 dated Jan. 24, 2022.

* cited by examiner

*Primary Examiner* — Thomas C Lee
*Assistant Examiner* — Charles Cai
(74) *Attorney, Agent, or Firm* — Maschoff Brennan

(57) ABSTRACT

A method may include obtaining a normal set point of a solar panel and a wind velocity measurement corresponding to wind that affects the solar panel. The method may include determining an allowable range of tilt angles according to a first lookup table that describes a relationship between the wind velocity measurement and the allowable range of tilt angles. The method may include identifying whether the normal set point of the solar panel is outside of the allowable range of tilt angles, and responsive to identifying that the normal set point of the solar panel is outside of the allowable range of tilt angles, determining a temporary stow set point. The method may include rotating the solar panel to the temporary stow set point.

18 Claims, 10 Drawing Sheets

300

| Wind Velocity (mph) | Allowable Tilt Angle Range Shown In +/- Degrees ||||
|---|---|---|---|---|
| | Wind Direction (Degrees from North) ||||
| | 110 | 120 | 130 | 140 |
| 0 | 52 | 52 | 52 | 52 |
| 5 | 51 | 51 | 51 | 50 |
| 10 | 50 | 49 | 49 | 49 |
| 15 | 48 | 48 | 48 | 47 |
| 20 | 47 | 47 | 46 | 46 |
| 25 | 46 | 45 | 45 | 44 |
| 30 | 45 | 44 | 43 | 43 |
| 35 | 43 | 43 | 42 | 41 |
| 40 | 42 | 41 | 40 | 40 |
| 45 | 41 | 40 | 39 | 38 |
| 50 | 40 | 39 | 38 | 36 |
| 55 | 39 | 37 | 36 | 35 |
| 60 | 37 | 36 | 35 | 33 |
| 65 | 36 | 35 | 33 | 32 |
| 70 | 35 | 33 | 32 | 30 |
| 75 | 34 | 32 | 30 | 29 |
| 80 | 32 | 31 | 29 | 27 |
| 85 | 31 | 29 | 27 | 26 |
| 90 | 30 | 28 | 26 | 24 |
| 95 | 29 | 27 | 25 | 22 |
| 100 | 28 | 25 | 23 | 21 |

| Current Set Point (Deg) | Direction To Change Tilt Angle | |
| --- | --- | --- |
| | Wind Direction (Degrees from North) | |
| | 0-179 Deg | 180-359 Deg |
| -52 | Positive | Positive |
| -48 | Positive | Positive |
| -44 | Positive | Positive |
| -40 | Positive | Positive |
| -36 | Positive | Positive |
| -32 | Positive | Positive |
| -28 | Positive | Positive |
| -24 | Positive | Positive |
| -20 | Positive | Positive |
| -16 | Positive | Positive |
| -12 | Positive | Positive |
| -8 | Positive | Positive |
| -4 | Positive | Positive |
| 0 | Positive | Positive |
| 4 | Negative | Positive |
| 8 | Negative | Positive |
| 12 | Negative | Positive |
| 16 | Negative | Positive |
| 20 | Negative | Positive |
| 24 | Negative | Positive |
| 28 | Negative | Positive |
| 32 | Negative | Positive |
| 36 | Negative | Positive |
| 40 | Negative | Negative |
| 44 | Negative | Negative |
| 48 | Negative | Negative |
| 52 | Negative | Negative |

*FIG. 4*

STOWING OF SOLAR POWER DEVICES

CROSS-REFERENCE TO RELATED APPLICATION

This application claims the benefit of U.S. patent application Ser. No. 63/093,685, filed on Oct. 19, 2020; the disclosure of which is incorporated herein by reference in its entirety.

THE FIELD OF THE DISCLOSURE

The present disclosure generally relates to stowing of solar power devices, and in particular, stowing of solar power devices in response to external forces, for example, those caused by wind.

BACKGROUND

Solar panels and solar arrays have been in use for years. Solar panels have been placed on homes and businesses for localized generation of electricity. Additionally, large sites have been created where rows of solar panels are used for large-scale electricity generation. However, environmental forces, such as wind, act on the solar panels, which can cause damage or even catastrophic failure of the solar panels and the associated mounting hardware and infrastructure.

The subject matter claimed herein is not limited to embodiments that solve any disadvantages or that operate only in environments such as those described. Rather, this background is only provided to illustrate one example technology area where some embodiments described herein may be practiced.

SUMMARY

One or more embodiments of the present disclosure may include systems and methods that act to manipulate the positioning of one or more solar panels so as to prevent damage thereto in the presence of adverse conditions, such as wind.

In one example embodiment, a method includes obtaining weather information, such as wind speed, from a suitable wind indicator associated with a solar installation or one or more solar panels. The method may include identifying whether the detected wind speed could adversely affect one or more of the solar panels due to, for example, a current position of the panels with respect to current wind conditions. In response, the method may include re-positioning (or maintaining a current position if optimal) one or more of the solar panels so as to reduce forces thereon from the wind. For example, the method may reposition one or more of the panels to be within a range of stow angles that have been determined to be optimal for the given wind condition (such as wind speed and direction).

One or more embodiments of the present disclosure may include a system that may include one or more rows of solar panels. The solar panels may be operatively connected to one or more actuators, sometimes referred to as "solar trackers." The actuators may adjust an orientation of the one or more rows of solar panels by, for example, rotating a torque tube that is operatively attached to a row of panels. Rotation of the torque tube results in a change to the angular orientation of the solar panels connected to it. The system may include a programmable controller that is configured to perform one or more operations related to the operation of the system. For example, operations may include obtaining current weather information, such as wind speed and determining whether the detected wind speed exceeds a predetermined threshold speed for a given orientation of the panels. If the wind speed is greater than a predetermined threshold value (thereby indicating potential damage to the solar panels), the operations may include causing the actuator to reposition (such as by rotation of a torque tube) of the one or more solar panels to be within an acceptable range of stow angles for the given wind condition.

Systems and methods of the current disclosure thereby provide the ability to react to current weather conditions, such as wind, in a manner that reduces the potential for damage to the solar panels of a given system.

It is to be understood that both the foregoing general summary and the following detailed description serve as examples and are explanatory and are not restrictive of the invention, as claimed.

BRIEF DESCRIPTION OF THE DRAWINGS

The appended drawings contain figures of preferred embodiments to further illustrate and clarify the above and other aspects, advantages, and features of the present disclosure. It will be appreciated that these drawings depict only example embodiments of the disclosure and are not intended to limit its scope. The present disclosure will be described and explained with additional specificity and detail through the use of the accompanying drawings in which:

FIG. 3 illustrates an example embodiment of a first lookup table;

FIG. 4 illustrates an example embodiment of a second lookup table;

Figure 1:
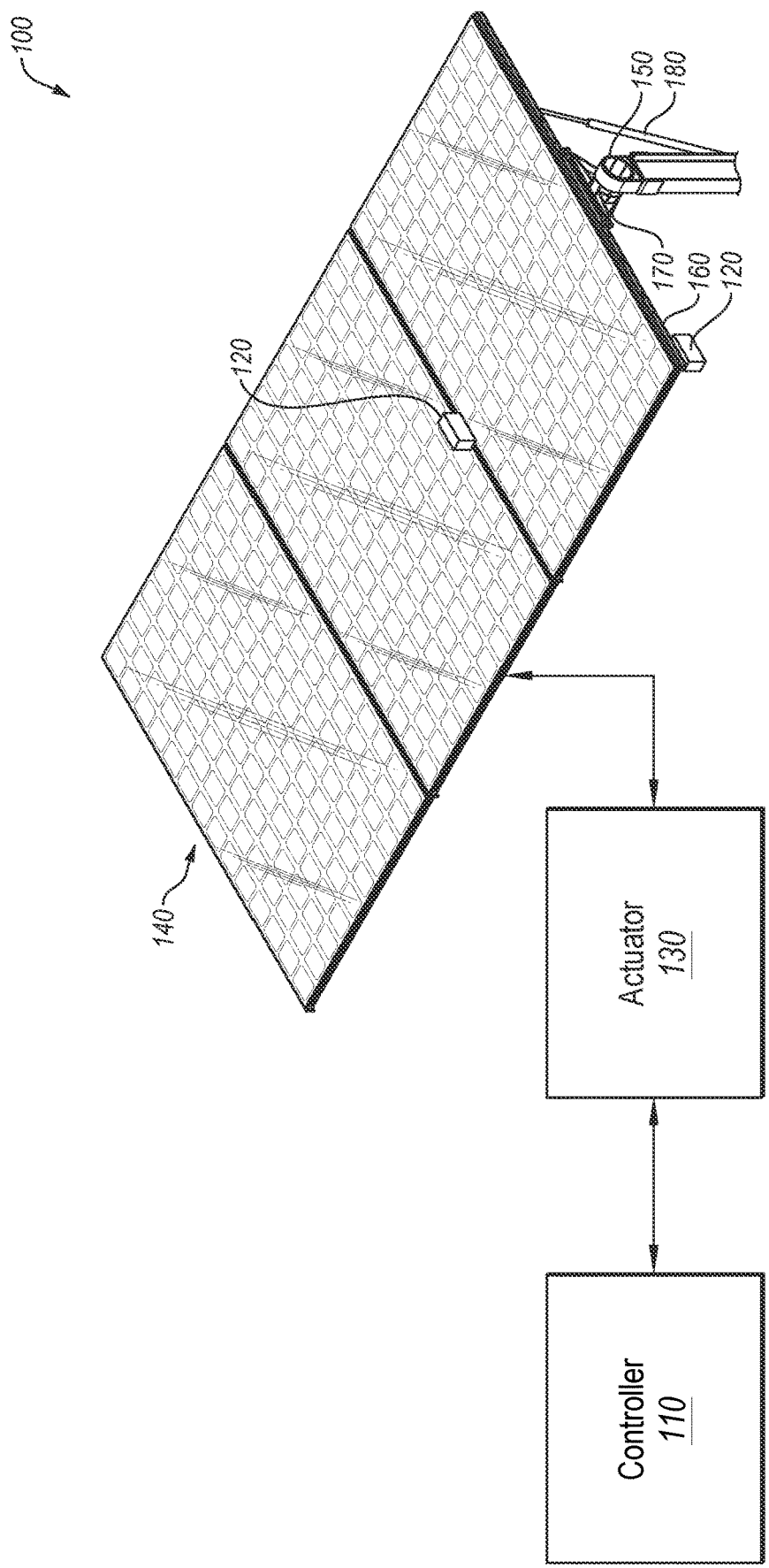
FIG. 1 illustrates an example system for facilitating the stow of solar panels.

all in accordance with at least one embodiment described in the present disclosure.

DETAILED DESCRIPTION

One or more embodiments of the present disclosure may relate, among other things, to the repositioning of solar panels. For example, re-orientation of one or more solar panels to an advantageous position (sometimes referred to as "stow" or "stowed" position) may be necessary due to an adverse weather condition. For example, solar panels may be repositioned to prevent rain or snow from accumulating on the solar panels. As another example, solar panels may be repositioned to reduce drag forces caused by wind flow acting on the solar panels. Many existing systems that utilize a stow operation have a binary option where if a weather service or a wind sensor for a solar site senses a certain wind speed, the entire site is tilted to a predetermined stow orientation at a shallow angle (e.g., close to horizontal) to reduce the chance of damage due to wind forces. However, doing so may result in a decrease in production of solar energy, especially if the solar panels are no longer optimally oriented towards the sun due to the shallow stow angle. Additionally or alternatively, stowing the solar panels at a shallow angle may reduce aerodynamic stability of the stowed solar panels because formation of vortices along edges of the stowed solar panels may cause the stowed solar panels to oscillate (a phenomena known as "galloping"). Thus, the process of stowing solar panels in response to strong winds often includes a tradeoff between reducing drag forces and maintaining aerodynamic stability of the solar panels.

One or more embodiments of the present disclosure may overcome one or more of these shortcomings by more accurately detecting conditions that warrant stowing (or repositioning) of solar panels and providing more intelligent stow orientations for a given condition.

In some embodiments, one or more sensors may be disposed on a given row or set of rows of panels that are operably connected to the same tracker actuator. The sensor(s) may be configured to monitor relevant forces and/or displacement of the given row or set of rows of panels. For example, the sensor may include a strain gauge (or similar) that monitors the forces imposed on the given row by, for example, wind. Alternatively, or in addition, the sensor(s) may measure rotation of a torque tube to which the solar panels are coupled within a solar tracking system. Alternatively or in addition, a sensor may measure a current velocity of the wind that is imposed on the solar panels.

In response to the conditions detected by the one or more sensors, a remedial action may be taken. For example, the given row of solar panels might be rotated a set number of degrees until a measured force (or wind speed, or any other relevant parameter) drops below a second threshold. Since conditions often vary even in the same solar site, in some embodiments, the remedial response may occur on a row-by-row basis or region by region basis, rather than the entire site.

To assist in the description of example embodiments, words such as top, bottom, front, rear, right, and left may be used to describe the accompanying figures. It will be appreciated that embodiments can be disposed in other positions, used in a variety of situations, and may perform a number of different functions. In addition, the drawings may be to scale and may illustrate various configurations, arrangements, aspects, and features of the solar tracking systems. It will be appreciated, however, that the present disclosure may include other suitable shapes, sizes, configurations, and arrangements depending, for example, upon the intended use or scale of project. Further, the solar tracking systems may include any suitable number or combination of aspects, features and the like. A detailed description of some example embodiments now follows.

FIG. 1 illustrates an example solar tracking system that may facilitate the stow of solar panels. As illustrated in FIG. 1, the system 100 may include a programmable controller 110 in communication with one or more sensors 120 and an actuator 130. The actuator 130 may be in communication with a row of solar panels 140 (or multiple rows of solar panels), that are moveably supported by the tracking system via a torque tube 150 that is capable of rotating, and thereby rotating the solar panels 140. The controller 110 may be configured to provide guidance to the actuator 130 as to what orientation the solar panels 140 are to be positioned by rotation of the torque tube 150. In these and other embodiments, one or more controllers 110 may be located on-site and directly or indirectly coupled to the solar panels for which the controllers 110 control operations. Additionally or alternatively, the controller 110 may include a controller system located off-site (e.g., at a remotely operated control center) such that the off-site controller system may receive information from the system of solar panels and send one or more control signals to the system of solar panels based on the received information. During ordinary operations, the actuator 130 may facilitate tracking the location of the sun relative to the solar panels 140 such that the solar panels 140 may be generally oriented substantially normal to the sun or substantially normal to the east-west portion of the irradiance of the sun, which may facilitate increased electrical energy generation. As described herein, in some embodiments, the system 100 may monitor the one or more sensors 120, and based on detected conditions, the system 100 may take some remedial action. For example, the actuator 130 may move the solar panels to a position better able to resist the drag forces caused by wind flow. As another example, a secondary feature such as damping or braking may be applied, again based on the conditions detected by the sensor.

In some embodiments, the sensor(s) 120 may be disposed at any of a variety of locations to monitor the forces experienced by the solar panels 140. For example, a sensor 120 may include a strain gauge disposed within or along the edge of the frame 160 or mounting brackets 170 for the solar panels 140. Although any suitable bracket might be used, one example of an exemplary mounting bracket implementation is disclosed in U.S. Pat. No. 9,281,778, the contents of which are incorporated herein by reference in its entirety. As another example, the sensor 120 may include a torque sensor associated with the torque tube 150 that is configured to detect forces imposed on the torque tube 150 (e.g., due to wind forces imposed on solar panels connected thereto). As a further example, the sensor 120 may include a displacement or stroke monitor in conjunction with a damper 180 coupled to the solar panels 140. In these and other embodiments, the damper 180 may be used for monitoring purposes and/or may be used to provide damping action to resist and/or mediate the forces applied to the solar panels 140. Additionally or alternatively, the damper may be implemented as disclosed in U.S. Pat. No. 10,771,007, the contents of which are incorporated by reference herein in its entirety. As an additional example, the sensor 120 may include an accelerometer and/or a gyroscope along the edge of the frame 160 or mounting brackets 170 for the solar panels 140 to monitor a physical position, motion, and/or degree of rotation relative to an expected physical position, motion, and/or degree of rotation. As another example, the sensor 120 may include a laser or other light emitting device oriented along an edge of the solar panels 140 and/or frames 160 thereof to detect movement, displacement, contortion, distortion, and/or variations along the surface. As an additional example, the sensor 120 may include an inclinometer disposed along an edge of the solar panels 140 and/or frames 160 thereof to detect an amount of incline experienced by the solar panels 140. While various examples of sensors 120 and/or their locations are identified, it will be appreciated that any sensor 120 at any location in the system 100 that facilitates detecting a property related to and/or associated with the forces being applied to the solar panels 140 may be utilized consistent with the present disclosure.

In some embodiments, the data of the sensor 120 may be monitored over time. For example, the data of the sensor 120 may be compared to a threshold as an absolute value, to a threshold as a rate of change. In some embodiments, the data of the sensor 120 may be compared as a difference from normal forces experienced throughout the day when performing solar tracking. For example, the sensor 120 may include a strain gauge disposed within the frame 160 of one or more of the solar panels, within one or more of the mounting brackets 170 supporting the panels and/or the torque tube 150 to monitor external forces. In these and other embodiments, there may be some baseline amount of strain due to gravity and/or torsional forces due to rotating the tracker to follow the sun. The difference in strain from typical values may facilitate determination of whether or not a remedial action is to be taken.

In some embodiments, the threshold for whether or not a remedial action is to be taken may be based on a threshold value (e.g., a certain amount of strain as an absolute value may trigger a remedial action), a threshold value for a threshold duration of time (e.g., a certain amount of strain is experienced for a set duration of time), and/or a number of times the threshold value is crossed in a given period of time (e.g., a certain amount of strain is experienced at least a set number of times in the given period of time). Any other similar force that may have an adverse effect on the system can also be monitored.

The remedial action may include any of a variety of actions to mitigate the effects of the forces experienced by the solar panels 140. For example, the remedial action may include the actuator 130 rotating the row of solar panels 140 by some predetermined amount. Such a response may be beneficial at lower wind speeds where vortexes may be forming where changing the orientation may reduce or eliminate the vortexes. As another example, changing the orientation of the panels may shed the load under high wind conditions. In some embodiments, the remedial action may include rotating the row of solar panels 140 a predetermined set number of degrees or a set distance from its current location to a remedial orientation. For example, the row of solar panels 140 may be rotated twenty degrees from its current location towards horizontal. In some embodiments, the remedial action may include rotating the row of solar panels 140 until some predetermined condition is met. For example, if the data of the sensor 120 is monitored in real time, the solar panels 140 may be rotated until the data of the sensor 120 drops below a threshold value.

In some embodiments, after rotating the solar panels 140, the system 100 may wait a predetermined period of time in the remedial orientation, and then may return the solar panels 140 to their normal tracked orientation tracking the position of the sun. In these and other embodiments, the orientation to which the solar panels 140 are returned may be different from the orientation out of which they were initially rotated (e.g., due to a tracking algorithm identifying a different orientation at the later time in the day when the solar panels are returned to the tracking orientations).

In some embodiments, after rotating the solar panels 140, the system 100 may remain in the remedial orientation until the data from a given sensor (or sensors) 120 drops below a threshold value. For example, the system 100 may hold the solar panels 140 in the remedial orientation until data from the sensor 120 indicates that the potentially damaging forces have subsided. After the data from the sensor 120 has dropped below the threshold value, the system 100 may return the solar panels 140 to their normal tracked orientation tracking the position of the sun.

In some embodiments, after rotating the solar panels 140, the system 100 may wait until the tracking algorithm catches up to the remedial orientation. After the orientations of the tracking algorithm reach the remedial orientation, the system 100 may continue to rotate the solar panels 140 according to the tracking algorithm to track the sun.

In some embodiments, the remedial action may include invocation of a secondary system in addition to or separately from the rotation of the row of solar panels 140. For example, such secondary systems may include a brake system that may clamp or grip the solar panels 140 to hold them in a fixed position. As another example, the secondary systems may include a damping system that may dampen the motion and/or forces of the solar panels 140 to minimize any motion or displacement experienced by the solar panels 140. In some embodiments, the sensor 120 may be part of the secondary system (such as a stroke sensor of the damping system).

In some embodiments, the remedial action may include a graded response. For example, if a first amount of force experienced exceeds a first threshold as indicated by data read from the sensor 120, the solar panels 140 may be moved by the actuator 130 a first amount. If a second amount of force is experienced that exceeds a second threshold higher than the first threshold, the solar panels may be moved a second amount further than the first amount. As another example of a graded response, after a remedial response is triggered, the controller 110 may determine a response proportional to the readings from the sensor 120 (e.g., if the threshold is exceeded by 10%, the remedial response may be 10% greater such as rotating by 22° instead of 20°).

In some embodiments, the system 100 may include a set number of stow positions (e.g., horizontal, +/−5°, +/−15°, +/−30°, etc.) as part of the remedial response. For example, the system 100 may stow the solar panels 140 to the closest stow position to the tracking algorithm orientation when a remedial response is triggered (e.g., if the tracking algorithm orientation is −40° and the remedial action is triggered, the solar panels 140 may be rotated to −30°). In these and other embodiments, if the remedial action trigger remains at the closest stow position, the system 100 may move to the next stow position (e.g., if the force is still above the threshold when at −30°, the system 100 may rotate the solar panels 140 to −15°, etc.).

In some embodiments, one or more of the stow positions may include ranges of stowing angles. In other words, a given stow position may include a corresponding range of angles within which the solar panels 140 may be rotated when operating under the remedial response. For example, a given remedial response may include limiting rotation of the solar panels 140 to within a certain range of angles (such as +/−15°, +/−30°, etc.). In these and other embodiments, if the current angle due to tracking is within the range, the remedial action may not disrupt the current position of the solar panels 140 but may prevent the solar panels 140 from following the tracking algorithm outside of the range.

Additionally or alternatively, the range of stowing angles permitted for the solar panels 140 in various stow positions may depend on the wind speed. For example, a first range of given remedial response may include limiting the rotation of the solar panels 140 to within a first range for a first wind speed threshold and may include further limiting the rotation of the solar panels 140 to a narrower range for a second wind speed threshold higher than the first wind speed threshold. For example, for the first wind speed threshold (e.g., 35 mph winds) the range may include +/−15° and for the second wind speed threshold (e.g., 45 mph winds) the range may include +/−7°.

Additionally, or alternatively, the range of stowing angles permitted for the solar panels 140 at a given period of time may depend on the angle of orientation of the solar panels 140 as determined by a tracking algorithm. For example, a given system of solar panels 140 may be oriented at 30° during a first period of time (e.g., between 9 A.M. and 10 A.M.). Responsive to the given system of solar panels 140 experiencing wind exceeding a first wind speed threshold (e.g., 35 mph winds), rotation of the solar panels 140 may be limited to within +/−10° of the 30° orientation as determined by the tracking algorithm. In other words, the solar panels 140 may rotate between 20° and 40° in this example. As another example, the given system of solar panels 140 may experience wind exceeding a second wind speed threshold (e.g., 45 mph winds), which may limit rotation of the solar panels 140 within +/−5° of the 30° orientation as determined by the tracking algorithm.

In some embodiments, the graded response may include a conclusive response. For example, after a severe force is experienced exceeding a high threshold, the system 100 may rotate the solar panels 140 to a conclusive stow position, such as horizontal, +/−5° from horizontal, or any other "safe" position. In these and other embodiments, such a stow position may be maintained for an extended time out period, such as the remainder of the day.

In some embodiments, the conclusive response may be triggered by a remedial action being taken a set number of times in a day, or in a given time window. For example, if a remedial action is triggered three times within a two-hour window, the conclusive response may be triggered for the remainder of the day. As another example, if a remedial action is triggered four times within a given day, the conclusive response maybe triggered for the remainder of the day. In some embodiments, the conclusive response may be triggered in conjunction with a graded remedial response. For example, if multiple stages of the graded response are triggered in a first remedial action, the triggering of a second remedial action later in the day may trigger the conclusive response.

The actuator 130 may include any device, system, or component configured to provide motion and/or change the orientation of the solar panels 140. For example, the actuator 130 may include an electric motor, a gas- or diesel-powered motor, and the like.

Modifications, additions, or omissions may be made to the system 100 without departing from the scope of the present disclosure. For example, the designations of different elements in the manner described is meant to help explain concepts described herein and is not limiting. Further, the system 100 may include any number of other elements or may be implemented within other systems or contexts than those described. For example, the system 100 may include any number of rows of solar panels, sensors and/or controllers.

Figure 2:
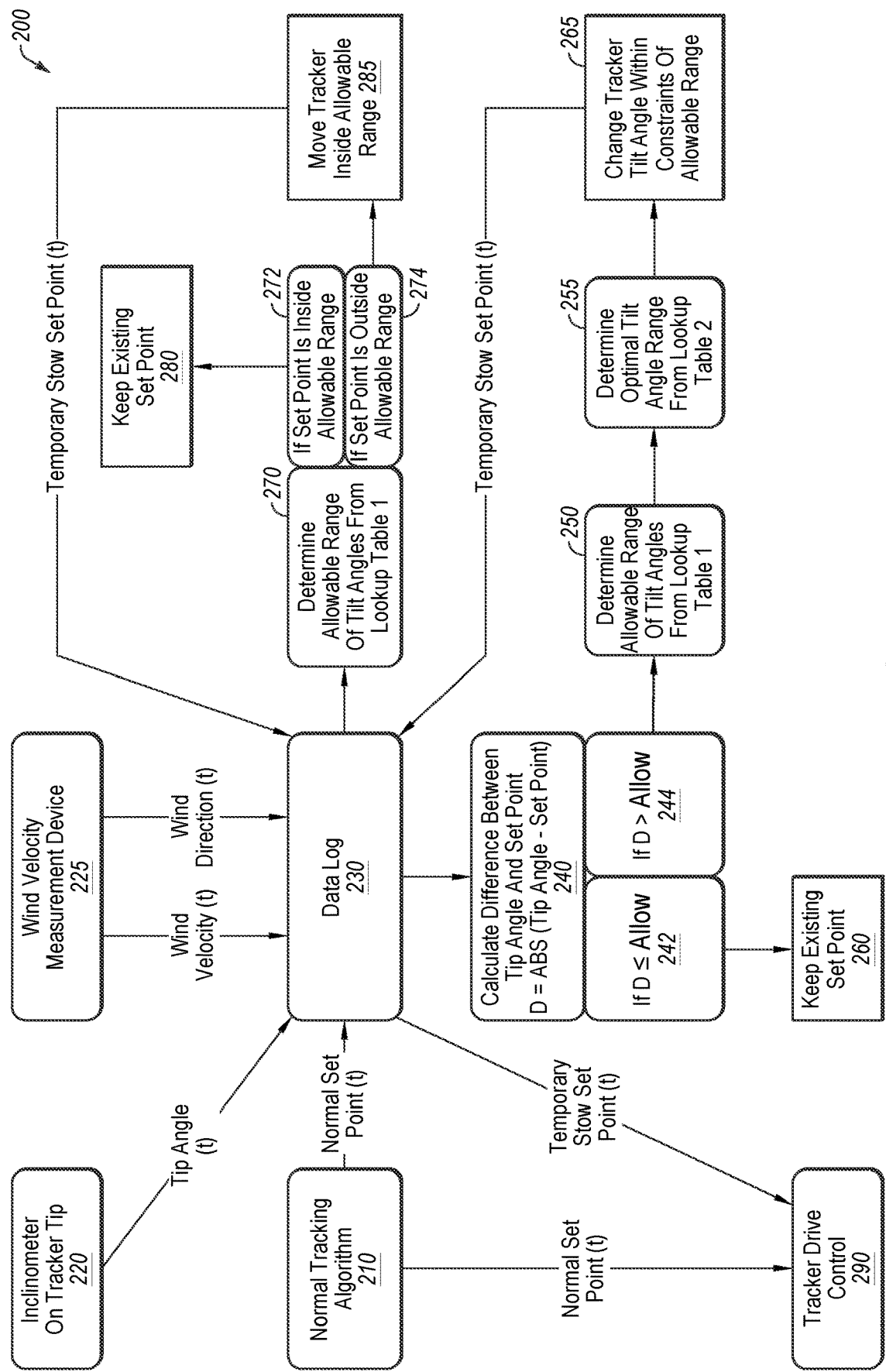
FIG. 2 is a flow diagram of an example tracking algorithm that directs one or more operations of an intelligent stow system according to at least one embodiment of the present disclosure.

In some embodiments, analysis of the captured sensor data and taking a corresponding remedial action based on the analyzed sensor data may follow a tracking algorithm that is implemented, for example, as programmable steps and executed at controller 110. FIG. 2 is a flow diagram of one example of a tracking algorithm 200 that directs one or more operations of an intelligent stow system according to at least one embodiment of the present disclosure. The tracking algorithm 200 may include a normal tracking algorithm at block 210 (herein referred to as "the normal tracking algorithm 210" in short) that determines a normal set point of one or more solar panels. In some embodiments, the normal set point of the solar panels may be determined as a function of time such that the normal tracking algorithm 210 indicates the solar panels should be set at a predetermined angle (or within a predetermined range of angles) at a given point in time. In these and other embodiments, the normal tracking algorithm 210 may be tailored to a given solar site based on sun coverage experienced by the solar site during a typical day, sun uptime in the geographical location of the solar site, and/or any other "normal" condition settings.

Additionally, or alternatively, in the illustrated embodiment the tracking algorithm 200 may include inclinometer sensor data at block 220 (herein referred to as "the inclinometer sensor data 220" in short) that describes a tip angle of the solar panels and/or wind velocity measurements at block 225 (herein referred to as "the wind velocity measurements 225" in short). The inclinometer sensor data 220 may be captured by an inclinometer, which may, for example, be positioned on a tip of a solar tracker associated with one or more of the solar panels. The inclinometer may determine a tip angle of the solar panels to which the solar tracker is coupled. The wind velocity measurements 225 may include information about a wind speed and a wind direction, for example.

In some embodiments, the normal set point determined by the normal tracking algorithm 210, the tip angle described by the inclinometer sensor data 220, and/or the wind velocity measurements 225 may be managed via a data log, denoted at block 230 (herein referred to as "the data log 230" in short). The data log 230 may be used to collate and/or otherwise organize the obtained data such that a temporary stow set point may be determined according to the tracking algorithm 200 at blocks 250 and 255 and/or blocks 270-274.

At block 240, the tracking algorithm 200 may calculate a difference, D, between the tip angle described by the inclinometer sensor data 220 and the normal set point determined by the normal tracking algorithm 210. In some embodiments, the difference may be calculated as an absolute value difference between the tip angle and the normal set point such that the difference describes a deviation from normal tracking behavior of the solar panels as defined by the normal tracking algorithm 210.

The difference may be compared to a threshold value (labeled as Allow in block 242 and block 244). Responsive to determining that the difference is less than or equal to the threshold value (e.g., D <Allow as labeled in block 242), the tracking algorithm 200 may proceed to block 260, and the normal set point determined by the normal tracking algorithm 210 may be maintained. In other words, the tracking algorithm 200 may determine at block 242 whether the tip angles of the solar panels have deviated from normal tracking behavior relative to the normal set point determined by the normal tracking algorithm 210. If the tip angles of the solar panels have not deviated from normal tracking behavior, then the tip angles may be maintained.

Responsive to determining that the difference is greater than the threshold value (e.g., D >Allow as labeled in block 244), the tracking algorithm 200 may proceed to block 250 where an allowable tilt angle range may be determined based on a first lookup table ("Lookup Table 1" in block 250). In some embodiments, the first lookup table may include information describing a relationship between two or more variables. For example, an example embodiment of a first lookup table excerpt 300 illustrated in FIG. 3 indicates an effect of a wind speed in miles per hour and a wind direction relative to North on an allowable range of tilt angles for a given solar site. As illustrated in the first lookup table excerpt 300, the allowable range of tilt angles is +/−52° when there is no wind, and as the wind speed increases, the allowable range of tilt angles decreases. Furthermore, assuming the solar panels of the solar site are oriented in an East-West direction such that rotation of the solar panels tracks the westward movement of the sun, the allowable range of tilt angles decreases as the wind direction becomes more parallel to the orientation of the solar panels. Determining the relationship between the two or more variables included in the first lookup table is described in further detail in relation to FIG. 5.

At block 260, an optimal tilt angle change may be determined according to a second lookup table based on the allowable range of tilt angles determined at block 250. For example, a second lookup table 400 illustrated in FIG. 4 indicates a direction to change the tilt angle of the solar panels based on a current set point and the wind direction relative to North. In other words, the second lookup table 400 may determine in which direction to change the tilt angle of the solar panels to stow the solar panels within the allowable range of tilt angles determined at block 250.

At block 265, a tracker tilt angle of the solar panels may be changed to fall within the constraints of the allowable range of tilt angles. In some embodiments, the tracker tilt angle may be determined according to the first lookup table at block 250 and/or the second lookup table at block 255. The tracker tilt angle may be obtained by the data log 230 and used as a temporary stow set point for the solar panels. In these and other embodiments, the data log 230 may send the temporary stow set point to a tracker drive control at block 290 (herein referred to as "the tracker drive control 290" in short).

Additionally or alternatively, the tracking algorithm 200 may proceed to block 270 where the allowable range of tilt angles is determined according to the first lookup table, and a temporary stow set point may be determined at block 272 and block 274. In some embodiments, the tracking algorithm 200 may first perform computations according to the process beginning at block 240 to determine the temporary stow set point at block 260 or block 265 and then verify the determined temporary stow set point based on the process beginning at block 270. Additionally or alternatively, the tracking algorithm 200 may perform the process beginning at block 270 while omitting performance of the process beginning at block 240 in situations where galloping and/or other aerodynamic instability of the solar panels are not likely to be present. Additionally or alternatively, the process beginning at block 270 may be omitted in situations where galloping and/or other aerodynamic instability of the solar panels are likely to be present.

At block 272, whether a set point of the solar panels is within an allowable range based on a threshold value may be determined. In some embodiments, the set point of the solar panels may be compared to the threshold value may be the normal set point determined by the normal tracking algorithm 210. Additionally or alternatively, the set point of the solar panels at block 272 may be the temporary stow set point determined at block 265. Responsive to determining that the set point is within the allowable range, the set point of the solar panels may be maintained at block 280.

Additionally or alternatively, whether the set point is outside of the allowable range may be determined at block 274. Responsive to determining that the set point is outside of the allowable range of tilt angles, an angle of rotation facilitated by the tracker of the solar panels may be calculated such that the tilt angle of the solar panels moves within the allowable range at block 285. In some embodiments, the tilt angle to which the solar panels are configured to move at block 285 may be considered the temporary stow set point that is sent to the data log. In some embodiments, the data log 230 may send the temporary stow set point to the tracker drive control 290 to affect rotation of the solar panels according to the temporary stow set point.

In some embodiments, the tracking algorithm 200 may be invoked to determine whether and how the solar panels should be stowed at timed intervals (e.g., every minute, every five minutes, every fifteen minutes, every hour, or any appropriate interval) to adjust the tip angle in response to changes in wind flow. Additionally or alternatively, the tracking algorithm 200 may be invoked in response to changes in the normal set point of the solar panels as determined by the normal tracking algorithm 210. Additionally or alternatively, the tracking algorithm 200 may be invoked responsive to changes in the wind velocity measurements 225.

Modifications, additions, or omissions may be made to the tracking algorithm 200 without departing from the scope of the disclosure. For example, the designations of different elements in the manner described is meant to help explain concepts described herein and is not limiting. Further, the tracking algorithm 200 may include any number of other elements or may be implemented within other systems or contexts than those described.

Figure 5:
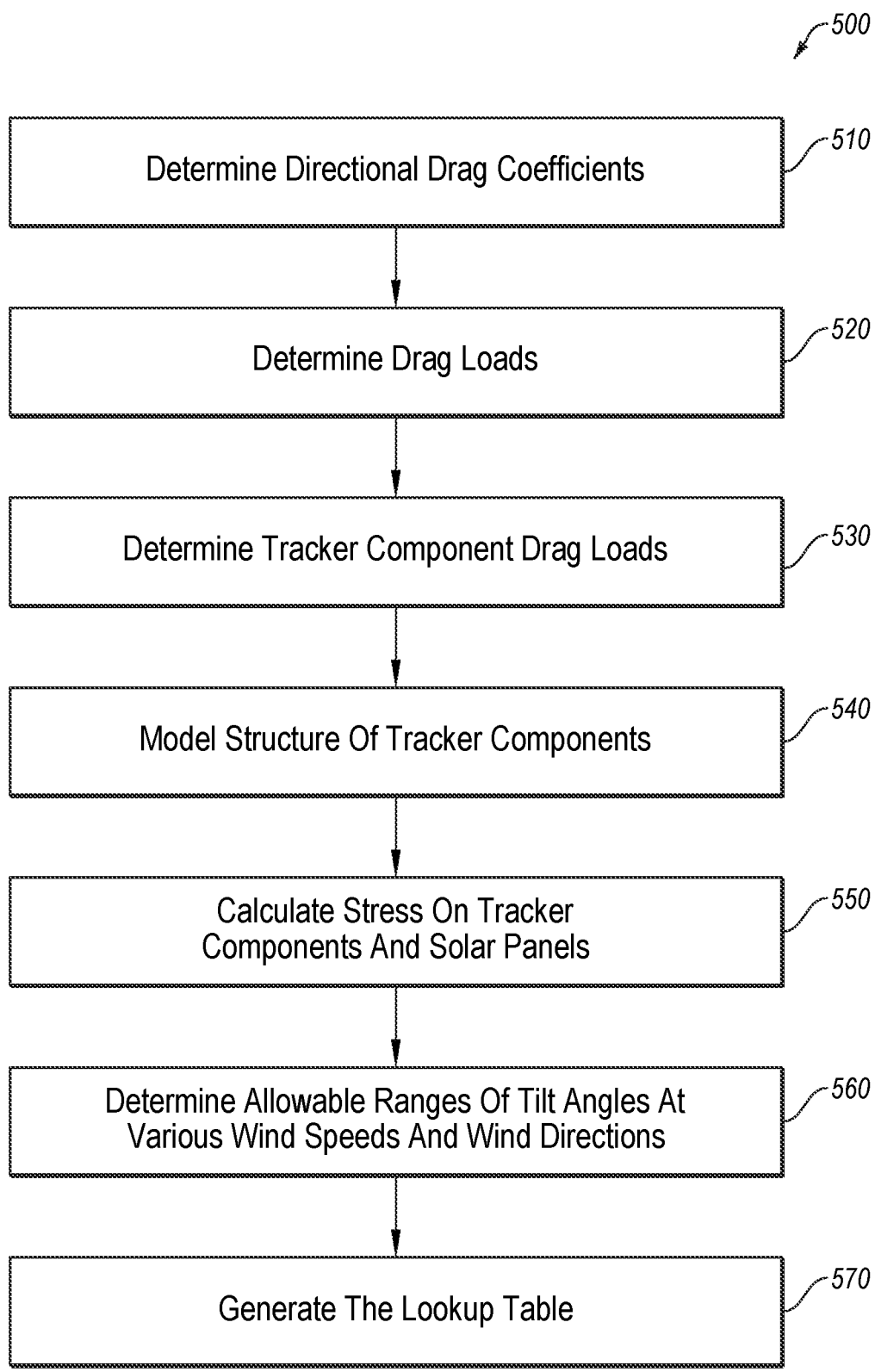
FIG. 5 illustrates a flow diagram of an example method of generating a lookup table.

FIG. 5 is a flow diagram of an example method 500 of generating a lookup table, such as the first lookup table corresponding to the first lookup table excerpt 300 of FIG. 3 and/or the second lookup table 400 of FIG. 4. The method 500 may be performed by any suitable system, apparatus, or device. For example, the controller 110 and/or the actuator 130 may perform one or more operations associated with the method 500. Additionally or alternatively, a computing system, such as computing system 1000 as described in relation to FIG. 10, may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 510 where directional drag coefficients of solar panels included in a solar site are determined according to wind tunnel tests. In some embodiments, the wind tunnel tests may include placing a mock solar site in a wind tunnel and determining the drag force experienced by the solar panels of the mock solar site at various wind velocities to calculate the directional drag coefficients of the solar panels and/or of the mock solar site.

Additionally or alternatively, the directional drag coefficients of the solar panels and/or of the mock solar site may be determined by any other methods. For example, the directional drag coefficients may be determined based on software that may simulate wind effects and drag force on modeled solar panels. As another example, software configured to model computational fluid dynamics may be used to analytically determine the effects of wind flow on one or more given solar panels. In these and other embodiments, more than one method may be used to determine the directional drag coefficients. For example, the directional drag coefficients may be independently determined according to the wind tunnel tests and computational fluid dynamics such that the directional drag coefficients determined via one process may be used to corroborate the directional drag coefficients determined via the other process.

At block 520, one or more drag loads (corresponding to the drag forces that affect the solar panels) may be determined. In some embodiments, the drag loads may be calculated according to any applicable design code and based on the directional drag coefficients determined at block 510. The applicable design code relating to a given solar site may be determined according to building standards for structural load requirements set by an international, national, regional, or local administration related to the given solar site. For example, a solar site being built in the United States of America may adhere to rules governing structural resistance to wind set in Minimum Design Loads and Associated Criteria for Buildings and Other Structures (ASCE/SEI 7-16), while the same solar site being built in Australia may adhere to rules set in AS/NZS 1170.2. In these and other embodiments, the directional drag coefficients may represent constant values and/or scaling coefficients for input values that facilitate computation of the drag loads affecting the solar panels according to the applicable design code.

At block 530, drag loads on tracker components may be determined. In some embodiments, the directional drag coefficients determined at block 510 may be applied to the applicable design code used at block 520 to calculate the drag loads to determine the drag loads on the tracker components.

At block 540, structures of the tracker components may be modeled. In some embodiments, modeling the structures of the tracker components may be facilitated by any modeling methods. For example, finite element analysis (FEA) may be implemented to divide a given tracker component into multiple pieces; the structures of each of the pieces may be analyzed, and the piecewise structures may be summed to determine the structure of the given tracker component. As another example, multi-body dynamics (MBD) may be implemented to determine the structure of the tracker components using a more holistic analytical approach relative to FEA.

Additionally or alternatively, any closed-form structural analysis may be performed to model the structures of the tracker components. In some embodiments, known beam stress, deflection, and/or material strain equations (e.g., equations promulgated by the American Institute of Steel Construction or equations published in Roark Formulas for Stress and Strain) may be used to analytically and mathematically model the structures of the tracker components.

At block 550, stress on the tracker components and/or the solar panels may be calculated. In some embodiments, the stress on the tracker components may correlate to the drag loads experienced by the tracker components. As such, the stress on the tracker components may be mathematically computed based on the drag loads.

At block 560, the allowable range of tilt angles at different combinations of wind speed and wind direction may be determined. In some embodiments, a maximum stress threshold for the solar panels and/or the tracker components may be set (e.g., by a human user). The allowable range of tilt angles may be determined based on the maximum stress threshold such that bounds of the allowable range of tilt angles correspond to the maximum stress threshold. For example, the bounds of the allowable range of tilt angles may be set such that the stress experienced by the solar panels and/or the tracker components at a given combination of wind speed, wind direction, and tip angle corresponds to the maximum stress threshold value. As such a given allowable range of tilt angles may be set for each combination of wind speed and wind direction for a given maximum stress threshold.

At block 570, the lookup table may be generated. In some embodiments, the wind speed and/or the wind direction may be set as row headings and/or column headings of the lookup table, and corresponding allowable ranges of tilt angles may populate each cell of the lookup table as shown in FIGS. 3 and 4. In these and other embodiments, the allowable ranges of tilt angles may represent a maximum tolerable drag force on the solar panels and/or the tracker components because the allowable ranges of tilt angles computed for each cell of the lookup table is associated with the stress experienced by the solar panels and/or the tracker components in which the stress is computed based on a drag force analysis of the solar panels.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
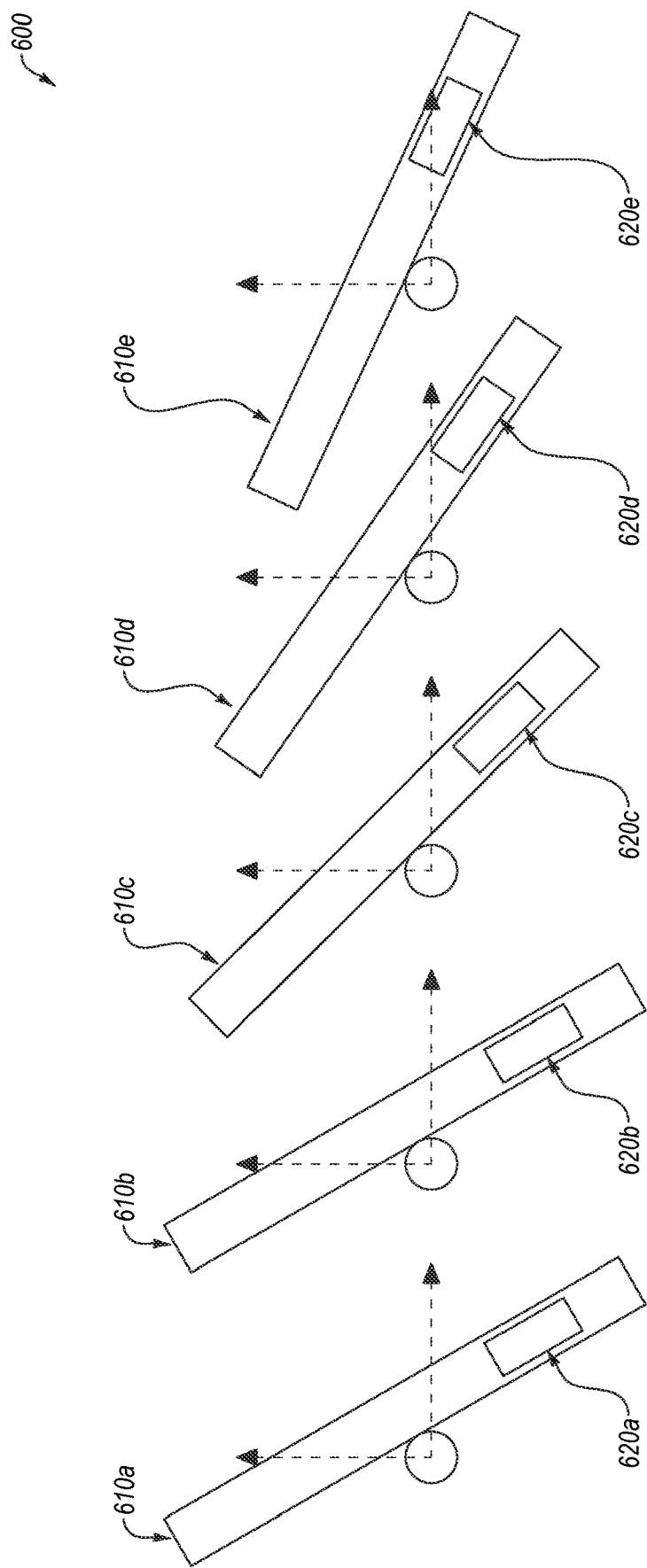
FIG. 6 illustrates another example system illustrating stow of various rows of solar panels.

FIG. 6 illustrates another example system 600 illustrating stow of various rows of solar panels 610, in accordance with one or more embodiments of the present disclosure. For example, the system 600 may illustrate the rows 610 (including the rows 610*a*-610*e*) stowed at different orientations and/or stowed and following a tracking algorithm (e.g., the tracking algorithm 200 described in relation to FIG. 2). Each of the rows 610 may include a corresponding sensor 620 (such as the rows 610*a*-610*e* including the sensors 620*a*-620*e*, respectively).

By way of example, the first and second rows 610*a* and 610*b* may experience less wind and consequently less drag forces than the other rows as indicated by the sensors 620*a* and 620*b*, and so may follow a tracking algorithm to remain in an orientation generally normal to the sun or normal to the east-west portion of the irradiance of the sun. For example, the first and second rows 610*a* and 610*b* may include a different normal tracking algorithm from the normal tracking algorithm 210, which may be used to control normal tracking of the other rows (e.g., rows 610*c*-610*e*). Such an orientation may result in a profile closer to vertical than the other rows 610*c*-610*e* as illustrated in FIG. 6.

The third row 610*c* may experience a first amount of drag force and may transition to a first stowed orientation that is a shallower angle than the orientation of the first and second rows 610*a* and 610*b*. For example, after a first threshold is exceeded as monitored by the sensor 620*c*, a remedial action may be undertaken to rotate the third row 610*c* until the data measured by the sensor drops below the threshold.

The fourth row 610*d* may experience a second amount of drag force and may transition to a second stowed orientation that is a shallower angle than the third row 610*c*. For example, after a second threshold is exceeded as monitored by the sensor 620*d*, a remedial action may be undertaken to rotate the fourth row 610*d* a set number of degrees towards horizontal from its current orientation.

The fifth row 610*e* may experience approximately the same first amount of drag force and may transition to a third stowed orientation that is a shallower angle than the fourth row 610*d*. For example, after the first threshold is exceeded as monitored by the sensor 620*e*, a remedial action may be undertaken to rotate the fifth row 610*e* until the data measured by the sensor 620e drops below the threshold, which may be further for the fifth row 610e than for the third row 610c.

By providing row by row control of the remedial actions, the entire system 600 may be able to operate in a more efficient manner. For example, the first and second rows 610a and 610b may not be experiencing the same forces as the rows 610c-610e and so may remain in the orientation that maximizes production.

In some embodiments, the system 600 may provide panel-by-panel control of the remedial actions. For example, the first row 610a may include five solar panels positioned adjacent to one another to form the first row 610a. The orientations of the first solar panel, the second solar panel, the third solar panel, the fourth solar panel, and/or the fifth solar panel may be controlled individually for the remedial actions. Panel-by-panel control of the remedial actions for a given row of solar panels may facilitate making more efficient remedial responses to forces experienced by the entire system 600. For example, stow angles of individual solar panels of a given row may be decreased gradually towards the middle of the given row such that solar panels on outer positions of the given row are stowed at end-panel stow positions that have the highest stow angles (e.g., steepest orientations) while the solar panels on inner positions of the given row are stowed at shallower stow angles than the end-panel stow positions. These and other remedial actions may facilitate shielding of the solar panels included on the inner positions from environmental effects and/or forces by the solar panels included on the outer positions stowed at the higher stow angles. While the example of individual panels is utilized, it will be appreciated that any number of panels or other portions less than an entire row being separately controlled is also contemplated.

While FIG. 6 has been described with reference to individual rows, it will be appreciated that groups of rows may be treated similarly with the same or a similar effect. For example, if the rows 610a and 610b were controlled by the same actuator, the rows 610a and 610b may be treated as a single unit. As another example, half of the row 620c may be treated as one independently controlled unit with the other half of the row 620c being treated independently, each half with its own actuator and/or controller to facilitate control of the unit. Additionally, the rows 610 illustrated in FIG. 6 may be spaced further apart and/or sized differently and are illustrated merely for the purposes of illustrating the underlying principle.

In some embodiments, a site-wide stow response may be coordinated. For example, a peripheral row (or rows) of solar panels 610a (and/or 610b) may be stowed at a steep angle, despite the wind forces, such that the internal rows (e.g., the rows 610c-610e) may be shielded from the wind. The peripheral rows 610a may be built with more robust components and/or increased damping capabilities to better withstand higher drag forces and/or aerodynamic instability (e.g., galloping or wobbling). Such a configuration may permit the majority of rows (e.g., the internal rows) to continue to largely follow the tracking algorithm while being shielded by the peripheral rows. As another example, the peripheral rows may experience the brunt of drag forces and so may tilt to a shallower stow angle (or range of angles) where the brunt of the drag force is experienced, and the internal rows may be able to more broadly follow the tracking algorithm (e.g., the stow range of angles for the internal rows may be a broader range of permitted angles compared to the peripheral rows). In these and other embodiments, individual sensors on individual rows may facilitate monitoring and/or providing an intra-site customized and variable response to wind forces.

Figure 7:
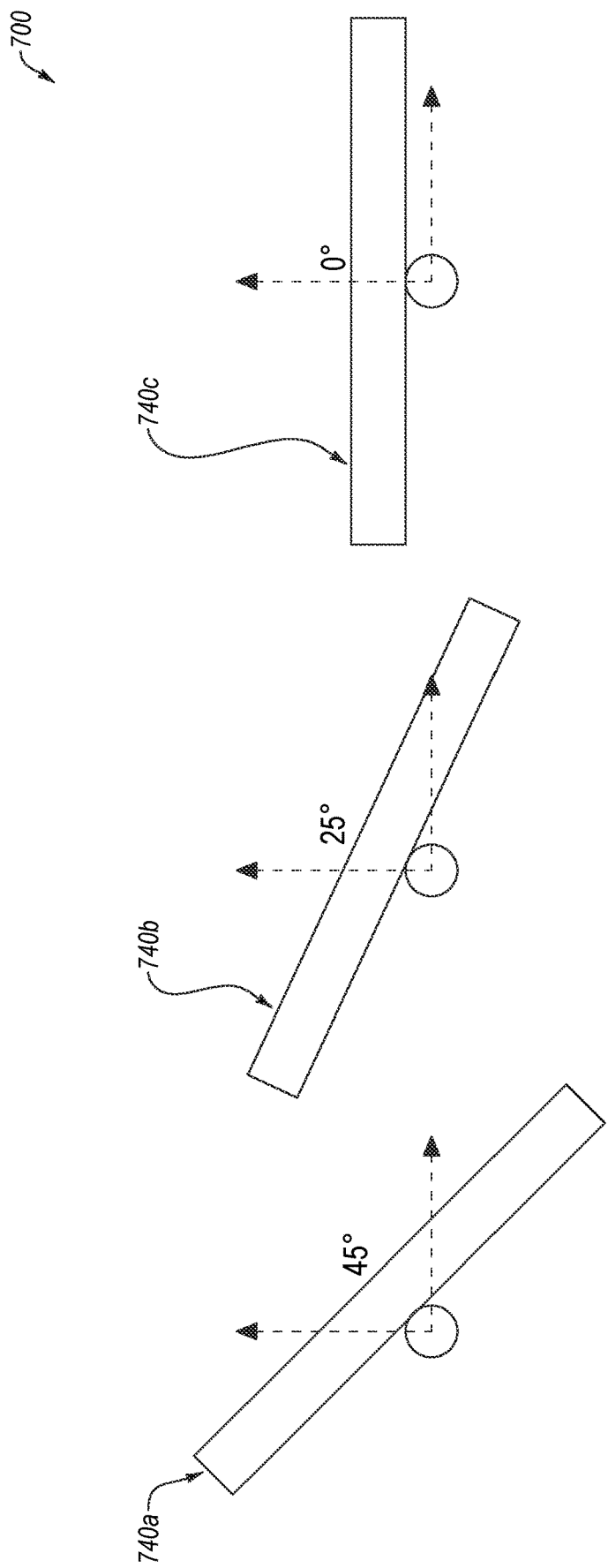
FIG. 7 illustrates various views of an example row of solar panels progressing through an example graded response in stowing the solar panels.

FIG. 7 illustrates example views 700 of an example row of solar panels 440 progressing through an example graded response in stowing the solar panels 440, in accordance with one or more embodiments of the present disclosure.

As illustrated in FIG. 7, the solar panels 740a may initially be at an orientation of 45° from horizontal based on a tracking algorithm. The solar panels 740a may experience forces that, as monitored by a sensor, exceed a threshold. Based on exceeding the threshold a remedial action may be taken. For example, the solar panels 740a may take remedial actions according to the tracking algorithm 200 described in relation to FIG. 2.

As illustrated in the second orientation of the solar panels 740b, the remedial action may rotate the solar panels 20° towards horizontal (e.g., from 45° to 25°). After rotating the solar panels 740b to the orientation of 25°, the solar panels 740b may continue to experience forces that, as monitored by the sensor, exceed the threshold. Based on the continued exceeding of the threshold, a second level of remedial action may be taken. For example, the solar panels 740b may experience varying wind velocities such that the tracking algorithm 200 frequently updates the stow position of the solar panels 740b.

As illustrated in the third orientation of the solar panels 740c, the second level of remedial action may rotate the solar panels an additional 30° towards horizontal. As the additional 30° would exceed horizontal, in some embodiments the solar panels 740b may be oriented in a horizontal position. In these and other embodiments, the forces experienced by the solar panels 740c may continue to be monitored by the sensor and may be returned to the tracking algorithm based on a duration of time or decrease in force experienced.

Figure 8:
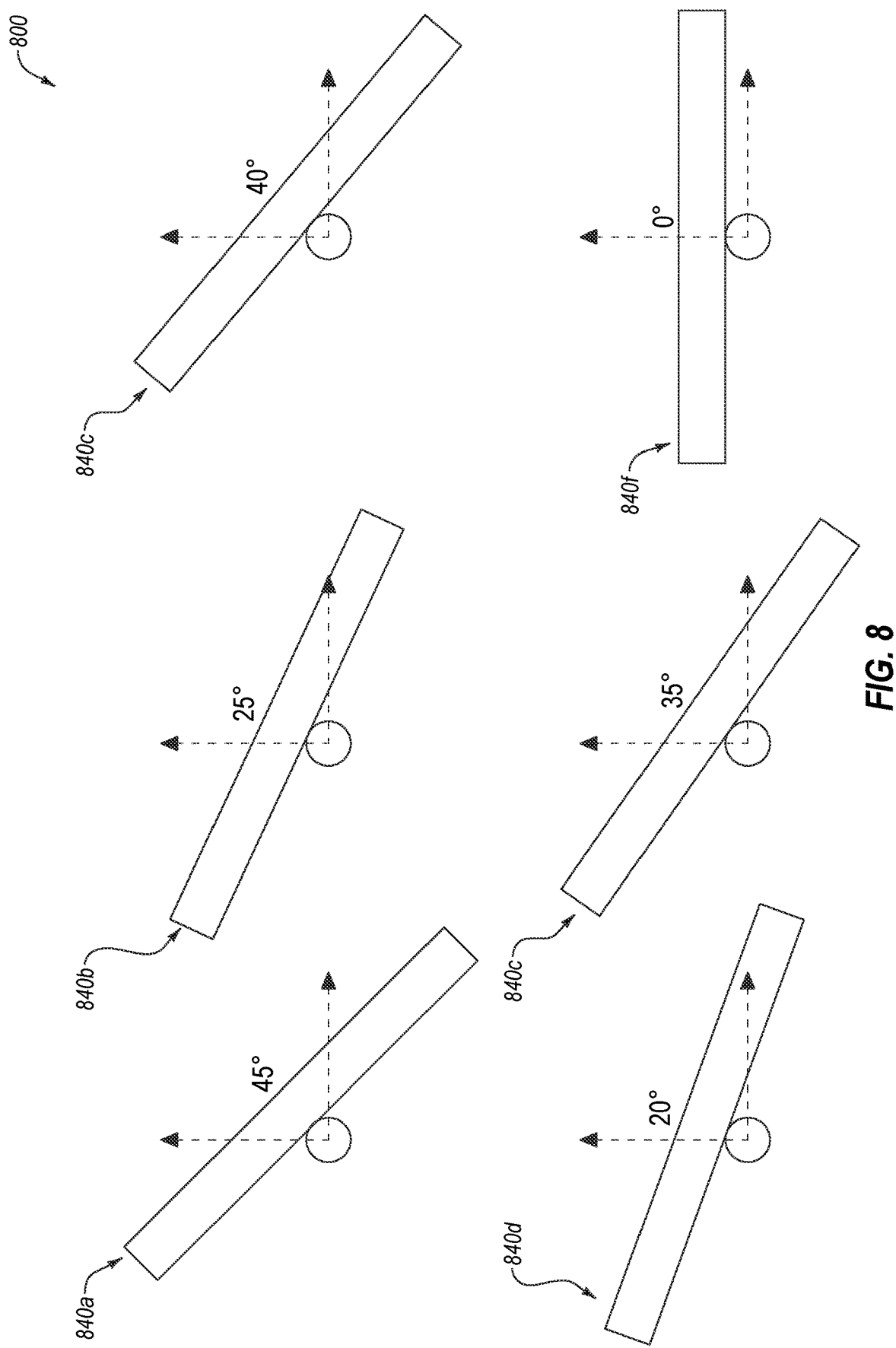
FIG. 8 illustrates various views of an example row of solar panels progressing through multiple example remedial actions and an example conclusive action.

FIG. 8 illustrates example views 800 of an example row of solar panels 840 progressing through multiple example remedial actions and an example conclusive action, in accordance with one or more embodiments of the present disclosure.

As illustrated in FIG. 8, the solar panels 840a may initially be at an orientation of 45° from horizontal based on a tracking algorithm. The solar panels 840a may experience forces that, as monitored by a sensor, exceed a threshold. Based on exceeding the threshold a remedial action may be taken.

As illustrated in the second orientation of the solar panels 840b, the remedial action may rotate the solar panels 20° towards horizontal (e.g., from 45° to 25°). After rotating the solar panels 840b to the orientation of 25°, the solar panels 840b may cease to experience drag forces beyond the threshold for a set period of time, as monitored by the sensor. Based on the decrease in drag forces, the solar panels 840b may be returned to the tracking orientation.

As illustrated in the third orientation of the solar panels 840c, the solar panels 840c may be returned to a normal set point according to a normal tracking algorithm. Because it is a later time in the day, the normal set point may be 40° in the third orientation while it was 45° in the first orientation.

While in the third orientation, the solar panels 840c may experience forces that, as monitored by the sensor, exceed the threshold. Based on exceeding the threshold a remedial action may be taken.

As illustrated in the fourth orientation of the solar panels 840d, the remedial action may rotate the solar panels 20° towards horizontal (e.g., from 40° to 20°). After rotating the solar panels 840d to the orientation of 20°, the solar panels

840*d* may cease to experience drag forces beyond the threshold for a set period of time, as monitored by the sensor. Based on the decrease in drag forces, the solar panels 840*d* may be returned to the tracking orientation.

As illustrated in the fifth orientation of the solar panels 840*e*, the solar panels 840*e* may be returned to a normal set point according to a normal tracking algorithm. Because it is a later time in the day, the normal set point may be 35° in the fifth orientation while it was 45° in the first orientation and 40° in the third orientation.

While in the fifth orientation, the solar panels 840*e* may experience forces that, as monitored by the sensor, exceed the threshold. Based on exceeding the threshold for a third time within a given period of time (e.g., a single day, a four-hour window, etc.) a conclusive action may be taken.

As illustrated in the sixth orientation of the solar panels 840*f*, the conclusive action may rotate the solar panels to a generally horizontal position. After rotating the solar panels 840*f* to the generally horizontal position, the solar panels 840*f* may be held in that orientation for the remainder of the day, for an extended period of time (e.g., four hours, six hours, etc.), or until some other metric or condition is met (e.g., a site wind sensor and the row-specific force sensor include readings below a given threshold).

While some embodiments of the present disclosure are described with reference to data monitored by a sensor, it will be appreciated that any combination of multiple factors may contribute to a determination that a remedial action (including a conclusive action) may be undertaken, or that a row of solar panels may be returned to tracking algorithm orientations. For example, a combination of a localized or site wind speed sensor and a strain gauge or displacement gauge for a specific row may be used for such determinations. As another example, a precipitation sensor or a severe-weather warning from a news source or weather service may be used in combination with accelerometers or inclinometers on the rows of solar panels.

Figure 9:
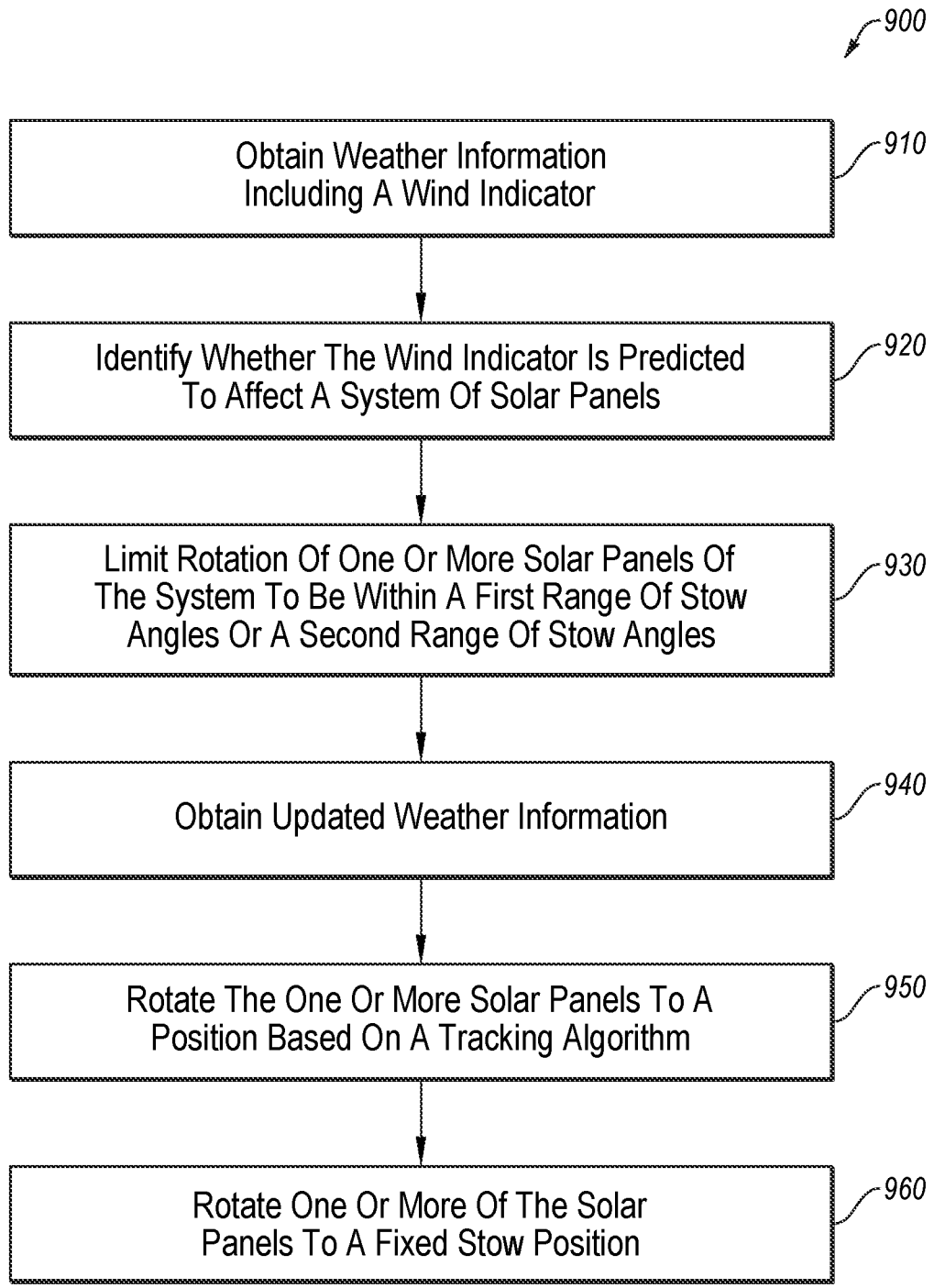
FIG. 9 is a flowchart of an example method 900 of stowing solar panels according to the present disclosure.

FIG. 9 is a flowchart of an example method 900 of stowing solar panels according to the present disclosure. The method 900 may be performed by any suitable system, apparatus, or device. For example, the controller 110 and/or the actuator 130 may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

The method 900 may begin at block 910, where weather information including a wind indicator of wind speed greater than a threshold value may be obtained by a system of solar panels (e.g., by a processor, a controller, and/or any other component of the system of solar panels). In some embodiments, the weather information may be collected by sensors included in the system of solar panels. For example, one or more of the solar panels may include strain gauges for measuring forces experienced by the solar panels, inclinometers, torque sensors, displacement and/or stroke monitors, accelerometers, gyroscopes, motion-detection lasers, anemometers, thermal sensors, barometers, and/or any other types of sensors that may capture information from the environment in which the system of solar panels is operating for weather information and/or information regarding operations of the solar panels. Additionally or alternatively, the system of solar panels may be communicatively coupled to one or more weather forecasting services such that the weather information may be obtained based on weather forecasts and/or information from such weather forecasting services.

At block 920, whether the wind associated with the wind indicator is predicted to affect the system of solar panels may be identified. Identifying whether the wind associated with the wind indicator will affect the system of solar panels may include predicting whether the wind will affect a geographic region in which the system of solar panels is located. For example, the wind associated with the wind indicator may not affect the system of solar panels if the weather information indicates the wind will pass by a region near, but not directly over, the system of solar panels. Additionally or alternatively, identifying whether the wind associated with the wind indicator will affect the system of solar panels may include determining the timing with which the wind affects the system of solar panels. For example, the weather information may indicate the wind will affect the system of solar panels at midnight. However, the solar panels may already be rotated to stow positions at that time such that remedial actions responsive to the wind would be unneeded.

At block 930, the rotation of one or more solar panels of the system of solar panels may be limited to within a first or a second range of stow angles responsive to identifying that the wind is predicted to affect the system of solar panels and that the wind speed is greater than the threshold wind speed value. In some embodiments, the rotation of the solar panels may be limited to the first range of stow angles responsive to determining that the wind speed is greater than a first threshold value, while the rotation of the solar panels may be limited to the second range of stow angles responsive to determining that the wind speed is greater than a second threshold value (e.g., a higher wind speed value resulting in a narrower range of stow angles for the second range). In some embodiments, the first range of stow angles may be bound by a first stowing angle and a second stowing angle, and the second range of stow angles may be bound by a third stowing angle and a fourth stowing angle. In these and other embodiments, the third stowing angle and/or the fourth stowing angle may include stowing angles that are between the first stowing angle and the second stowing angle (e.g., if the second threshold is a higher wind speed than the first threshold). Additionally or alternatively, the third stowing angle and/or the fourth stowing angle may include stowing angles that are not between the first stowing angle and the second stowing angle (e.g., if the second threshold is a lower wind speed than the first threshold). Additionally or alternatively, there may be some overlap between the first range of stow angles and the second range of stow angles. In these and other embodiments, an allowable range of tilt angles may be determined according to a tracking algorithm, such as the tracking algorithm 200 described in relation to FIG. 2, by considering a normal set point of the solar panels, a tip angle of the solar panels, and the wind velocity.

At block 940, updated weather information may be obtained. In some embodiments, the updated weather information may be obtained in the same or a similar way as the weather information obtained at block 910. Additionally or alternatively, whether the updated weather information affects the solar panels may be determined (e.g., in the same or a similar way as described at block 920).

At block 950, responsive to determining that the wind speeds fall below the threshold value, rotation of the solar panels may be permitted to operate within a full range of angles of orientation. In some embodiments, the solar panels may be rotated to an angle of orientation according to a tracking algorithm such that the system of solar panels may "resume" ordinary operations (e.g., operations relating to solar tracking without any high winds according to the normal tracking algorithm 210).

Additionally or alternatively, one or more of the solar panels may be rotated to a fixed stow position responsive to making one or more determinations regarding operations of the system of solar panels at block 960. The fixed stow position may include an angle of orientation and/or a range of stowing angles at which the solar panels are most resistant to adverse weather conditions. In these and other embodiments, the angle of orientation and/or the range of stowing angles corresponding to the fixed stow position may or may not consider the energy-generating potential of the solar panels while in the fixed stow position because resisting adverse weather conditions (e.g., high winds) may be considered a more important consideration in situations in which the solar panels are stowed in the fixed stow position.

In some embodiments, the determinations resulting in rotation of the solar panels to the fixed stow position may include determining that the rotation of the solar panels has been previously limited at least a threshold number of times within a given period of time (e.g., the system has responded to an adverse weather event three times previously during a single day). Additionally or alternatively, the determinations resulting in rotation of the solar panels to the fixed stow position may include identifying a wind indicator that may be designated as a severe wind condition (e.g., the weather service has issued a wind weather advisory warning).

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

Figure 10:
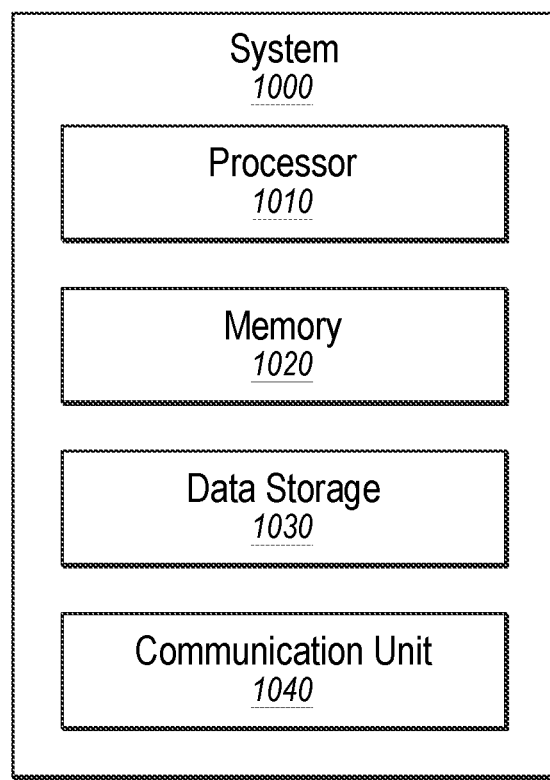
FIG. 10 is an example computing system.

FIG. 10 illustrates an example computing system 1000, according to at least one embodiment described in the present disclosure. The computing system 1000 may include a processor 1010, a memory 1020, a data storage 1030, and/or a communication unit 1040, which all may be communicatively coupled. Portions of the system of FIG. 1 may be implemented as a computing system consistent with the computing system 1000, including the controller 110, the sensors 120, and/or the actuator 130.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to cause the system 1000 to perform the operations of the method 900 of FIG. 9 and/or the operations of the tracking algorithm 200 of FIG. 2. For example, in response to execution of the instructions by the processor 1010, the system 1000 may obtain weather information including a wind indicator, identify whether the wind associated with the wind indicator is predicted to affect a system of solar panels, limit rotation of one or more solar panels of the system of solar panels to be within a first range of stow angles (or a second range of stow angles), obtain updated weather information, rotate one or more of the solar panels to a position based on a tracking algorithm, and/or rotate one or more of the solar panels to a fixed stow position.

The memory 1020 and the data storage 1030 may include computer-readable storage media or one or more computer-readable storage mediums for having computer-executable instructions or data structures stored thereon. Such computer-readable storage media may be any available media that may be accessed by a general-purpose or special-purpose computer, such as the processor 1010. For example, the memory 1020 and/or the data storage 1030 may store the weather information, the wind indicator, the normal set point, the tip angle, and/or any computational results of the tracking algorithm. In some embodiments, the computing system 1300 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a certain operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1340 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in a specific controller, implementation in software (stored on and/or executed by general purpose hardware) are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

What is claimed is:

1. A method, comprising:
   obtaining a normal set point of a solar panel and a wind velocity measurement corresponding to wind that affects the solar panel;
   determining an allowable range of tilt angles according to a first lookup table that describes a relationship between the wind velocity measurement and the allowable range of tilt angles;
   identifying whether the normal set point of the solar panel is outside of the allowable range of tilt angles;
   determining a temporary stow set point responsive to identifying that the normal set point of the solar panel is outside of the allowable range of tilt angles, wherein a direction for tilting the solar panel to reach the temporary stow set point is determined using a second lookup table based on the normal set point and a wind direction; and
   rotating the solar panel to the temporary stow set point.

2. The method of claim 1, wherein determining the allowable range of tilt angles further comprises:
   obtaining a tip angle of the solar panel;
   determining whether a difference between the normal set point and the tip angle of the solar panel is within a threshold value; and
   determining the allowable range of tilt angles based on the first lookup table responsive to determining that the difference between the normal set point and the tip angle of the solar panel is greater than the threshold value.

3. The method of claim 2, wherein determining the temporary stow set point further comprises determining an optimal tilt angle change based on the second lookup table.

4. The method of claim 1, wherein the first lookup table comprises one or more allowable ranges of tilt angles, each of the one or more allowable ranges of tilt angles being determined in relation to a wind speed and a wind direction.

5. The method of claim 4, wherein a relationship between each of the allowable ranges of tilt angles, and a corresponding wind speed and a corresponding wind direction is determined based on a drag load analysis, the drag load analysis comprising:
  determining one or more directional drag coefficients of the solar panel, each of the directional drag coefficients corresponding to a given wind speed and a given wind direction;
  calculating one or more drag loads that affect the solar panel based on the directional drag coefficients;
  determining a drag load that affects a tracker component coupled to the solar panel;
  modeling a structure of the tracker component based on the determined drag load affecting the tracker component;
  calculating stress on the tracker component according to the modeled tracker component structure;
  setting a stress threshold value; and
  identifying an allowable range of tilt angles based on the stress threshold value for the corresponding wind speed and the corresponding wind direction.

6. The method of claim 5, wherein the directional drag coefficients of the solar panel are determined using at least one of: wind tunnel simulations or computational fluid dynamics.

7. A system, comprising:
  one or more processors; and
    one or more non-transitory computer-readable storage media configured to store instructions that, in response to being executed, cause the system to perform operations, the operations comprising:
      obtaining a normal set point of a solar panel and a wind velocity measurement corresponding to wind that affects the solar panel;
      determining an allowable range of tilt angles according to a first lookup table that describes a relationship between the wind velocity measurement and the allowable range of tilt angles;
      identifying whether the normal set point of the solar panel is outside of the allowable range of tilt angles;
      determining a temporary stow set point responsive to identifying that the normal set point of the solar panel is outside of the allowable range of tilt angles, wherein a direction for tilting the solar panel to reach the temporary stow set point is determined using a second lookup table based on the normal set point and a wind direction; and
      rotating the solar panel to the temporary stow set point.

8. The system of claim 7, wherein determining the allowable range of tilt angles further comprises:
  obtaining a tip angle of the solar panel;
  determining whether a difference between the normal set point and the tip angle of the solar panel is within a threshold value; and
  determining the allowable range of tilt angles based on the first lookup table responsive to determining that the difference between the normal set point and the tip angle of the solar panel is greater than the threshold value.

9. The system of claim 8, wherein determining the temporary stow set point further comprises determining an optimal tilt angle change based on the second lookup table.

10. The system of claim 7, wherein the first lookup table comprises one or more allowable ranges of tilt angles, each of the one or more allowable ranges of tilt angles being determined in relation to a wind speed and a wind direction.

11. The system of claim 10, wherein a relationship between each of the allowable ranges of tilt angles, and a corresponding wind speed and a corresponding wind direction is determined based on a drag load analysis, the drag load analysis comprising:
  determining one or more directional drag coefficients of the solar panel, each of the directional drag coefficients corresponding to a given wind speed and a given wind direction;
  calculating one or more drag loads that affect the solar panel based on the directional drag coefficients;
  determining a drag load that affects a tracker component coupled to the solar panel;
  modeling a structure of the tracker component based on the determined drag load affecting the tracker component;
  calculating stress on the tracker component according to the modeled tracker component structure;
  setting a stress threshold value; and
  identifying an allowable range of tilt angles based on the stress threshold value for the corresponding wind speed and the corresponding wind direction.

12. The system of claim 11, wherein the directional drag coefficients of the solar panel are determined using at least one of: wind tunnel simulations or computational fluid dynamics.

13. A method, comprising:
  obtaining weather information including a wind indicator of wind speed greater than a threshold;
  identifying whether wind associated with the wind indicator is predicted to affect a system of solar panels; and
  responsive to identifying that the wind is predicted to affect the system of solar panels and that the wind speed is greater than the threshold, limiting rotation of one or more solar panels of the system of solar panels to be within a range of stow angles between a first stow angle and a second stow angle according to:
    a first lookup table that describes a relationship between a wind velocity measurement and the range of stow angles; and
    a second lookup table that describes a direction for tilting the solar panel to limit rotation of the one or more solar panels based on a normal set point of the one or more solar panels and a wind direction.

14. The method of claim 13, wherein obtaining the weather information comprises identifying the wind indicator based on information from a weather forecasting service.

15. The method of claim 13, wherein obtaining the weather information comprises identifying the wind indicator based on sensor data captured by one or more sensors included in the system of solar panels.

16. The method of claim 13, wherein the sensor data captured by the sensors included in the system of solar panels are captured by one or more sensors selected from a group comprising: inclinometers, torque sensors, displacement monitors, stroke monitors, accelerometers, gyroscopes, motion-detection lasers, anemometers, thermal sensors, and barometers.

17. The method of claim 13, further comprising rotating one or more of the solar panels to a fixed stow position responsive to making one or more determinations selected from the group consisting of:
  the wind indicator is designated as a severe wind condition; and the rotation of the solar panels has been limited at least a threshold number of times within a given time period.

18. The method of claim 13, wherein a peripheral set of solar panels at a periphery of the system of solar panels is at a steeper orientation than the one or more solar panels, the one or more solar panels positioned inside of the periphery of the system of solar panels.

\* \* \* \* \*